(12) United States Patent
Gschwind et al.

(10) Patent No.: US 8,954,850 B2
(45) Date of Patent: Feb. 10, 2015

(54) COMPUTER-IMPLEMENTED METHOD AND SYSTEMS FOR ASSISTING A USER IN APPLYING A BUSINESS PROCESS PATTERN

(75) Inventors: Thomas Gschwind, Zurich (CH); Wolfgang Bernhard Kleinoeder, Richterswil (CH); Jana Koehler, Oberrieden (CH); Oleksandr Maystrenko, Horgen (CH); Janette Siu Jong Wong, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 12/635,216

(22) Filed: Dec. 10, 2009

(65) Prior Publication Data

US 2011/0145707 A1 Jun. 16, 2011

(51) Int. Cl.
G06F 3/00 (2006.01)
G06F 3/048 (2013.01)
G06Q 10/10 (2012.01)

(52) U.S. Cl.
CPC ..................................... *G06Q 10/10* (2013.01)
USPC ............ 715/708; 715/810; 715/764; 715/850

(58) Field of Classification Search
USPC .......................................... 715/810, 764, 708
See application file for complete search history.

(56) References Cited

U.S. PATENT DOCUMENTS

| | | | |
|---|---|---|---|
| 6,701,513 B1 * | 3/2004 | Bailey ............................ | 717/109 |
| 7,058,899 B2 * | 6/2006 | Petruk et al. ................... | 715/763 |
| 7,197,740 B2 | 3/2007 | Beringer et al. | |
| 7,340,721 B1 * | 3/2008 | Bailey ............................ | 717/109 |
| 7,761,865 B2 * | 7/2010 | Stienhans et al. ............. | 717/170 |
| 2005/0171833 A1 * | 8/2005 | Jost et al. ......................... | 705/10 |
| 2005/0257157 A1 * | 11/2005 | Gilboa et al. .................. | 715/747 |
| 2006/0129974 A1 * | 6/2006 | Brendle et al. ................. | 717/108 |
| 2009/0216731 A1 * | 8/2009 | Markovic ........................... | 707/4 |
| 2010/0050152 A1 * | 2/2010 | Gilboa ........................... | 717/106 |
| 2010/0235839 A1 * | 9/2010 | Hu et al. ........................ | 718/100 |

(Continued)

OTHER PUBLICATIONS

"IBM WebSphere." available at http://www-01.ibm.com/software/websphere/, last accessed Dec. 10, 2009, 3 pages.

(Continued)

*Primary Examiner* — Amy Ng
*Assistant Examiner* — Erik Stitt
(74) *Attorney, Agent, or Firm* — Jeffrey T. Holman (57) ABSTRACT

A computer-implemented method for assisting a user in applying a business process pattern. In some embodiments, the computer-implemented method includes providing a graphical user interface (GUI) adapted for displaying a first representation of a business process and for allowing user editing of the business process. The computer-implemented method also includes receiving a user selection of a fragment of the business process as displayed in the first representation. In some embodiments, the computer-implemented method includes calling a second representation of the business process, the second representation including a hierarchy of fragments of business process, and checking whether the fragment selected by the user corresponds to one of the fragments of the second representation. The computer-implemented method may also include instantiating a business process pattern using the selected fragment if the fragment selected corresponds. The selected fragment is re-usable within the business process pattern.

24 Claims, 7 Drawing Sheets

(56) References Cited

U.S. PATENT DOCUMENTS

2011/0125667 A1* 5/2011 Faludi et al. .................. 705/348
2012/0197864 A1* 8/2012 Bourdoncle et al. .......... 707/711

OTHER PUBLICATIONS

Gamma et al. "Design Patterns: Abstraction and Reuse of Object-Oriented Design." Proceedings of the 7th European Conference on Object-Oriented Programming, (1993), pp. 406-431.

Schmidt et al. "Patterns, Frameworks, and Middleware: Their Synergistic Relationships." Proceedings of the 25th International Conference on Software Engineering, (2003), pp. 694-704.

"Workflow Patterns." available at http://www.workflowpatterns.com, last accessed Dec. 10, 2009, 2 pages.

Kobayashi et al. "A Business Process Design Method for Applying Workflow Tools." Proceedings of 1997 IEEE International Conference on System, Man, and Cybernetics, (Oct. 1997), pp. 2314-2319.

"Software AG/IDS Scheer." available at http://www.ariscommunity.com/users/frank-weyand/2009-08-25-building-your-models-using-bricks-fragments, last accessed Dec. 10, 2009, 3 pages.

"AristaFlow® BPM Suite." available at http://dbis.eprints.uni-ulm.de/488/1/Reichert_02_09.pdf, last accessed Dec. 10, 2009, 35 pages.

* cited by examiner

COMPUTER-IMPLEMENTED METHOD AND SYSTEMS FOR ASSISTING A USER IN APPLYING A BUSINESS PROCESS PATTERN

BACKGROUND

The invention relates to the field of computer-implemented methods and computer systems for helping users when applying business process patterns.

A process pattern encapsulates a solution to a specific but re-occurring problem. Patterns are created by e.g. observing (or "mining") a variety of solutions that different people have created over time when working on the same problem. A pattern encapsulates common features to these solutions, yet ensuring that the problem is solved. Examples of collections of patterns are the object-oriented design patterns by Gamma et al. (see E. Gamma, R. Helm, R. Johnson, and J. Vlissides: Design patterns: Abstraction and reuse of object-oriented design, In Proceedings of ECOOP'93, Springer-Verlag), the software architecture patterns by Buschmann et al. (see e.g. Schmidt, D. C. and Buschmann, F. 2003. Patterns, frameworks, and middleware: their synergistic relationships. In *Proceedings of the 25th international Conference on Software Engineering* (Portland, Oreg., May 3-10, 2003). International Conference on Software Engineering. IEEE Computer Society, Washington, D.C., 694-704, and references therein), and the workflow patterns by Russell, van der Aalst and co-workers, see e.g. www.workflowpatterns.com, as of Dec. 4, 2009).

Besides, Beringer et al. (U.S. Pat. No. 7,197,740 B2) describes pattern-based software design where business process patterns (amongst other types of patterns) are selected from a set of available patterns. Specifically, the pattern that best matches the requirements for the software application to be developed is selected. After selection, the pattern is configured according to requirements by mapping the requirements to the pattern.

Next, Kobayashi et al. (T. Kobayashi, S. Ogoshi and N. Komoda, A business process design method for applying workflow tools, in: Proc. of 1997 IEEE International Conference on System, Man, and Cybernetics, Orlando, Fla., USA (October 1997) pp. 2314-2319 describes a specific process design method using Winograd's commitment network pattern. The result is a specific process design. A concept of "business process design pattern" is introduced as a basic structure for the target business independent of the problem change.

Software AG/IDS Scheer has recently released a solution (in their modeling tool) that allows for selecting a part of a process model and creating a fragment out of the selected part that is stored in a separate view from where it can be reused by dragging and dropping on the editor canvas, see http://www.ariscommunity.com/users/frank-weyand/2009-08-25-building-your-models-using-bricks-fragments, as retrieved on Nov. 30, 2009.

The modeling tool of the AristaFlow® BPM Suite requires users to select a modeling element and then provides a set of editing operations that are valid for the current selection. The selection of model elements, which is restricted to a single connection or a single element, describes the context for the operation. This approach ensures that a consistent model can be transformed into another consistent model, see http://dbis.eprints.uni-ulm.de/488/1/Reichert_02_09.pdf, as retrieved on Nov. 30, 2009.

P. Hruby (Model-Driven Design using Business Patterns, Springer 2006) introduces business patterns describing relations between agents, resources, and actions. These patterns differ significantly from process patterns as defined above. Here the patterns are represented in an object-oriented (class diagram-like) representation, from which the resulting data base application is directly derived.

SUMMARY

Embodiments of a computer-implemented method for assisting a user in applying a business process pattern are described. In some embodiments, the computer-implemented method includes providing a graphical user interface (GUI) adapted for displaying a first representation of a business process and for allowing user editing of the business process. The computer-implemented method also includes receiving a user selection of a fragment of the business process as displayed in the first representation. In some embodiments, the computer-implemented method includes calling a second representation of the business process, the second representation including a hierarchy of fragments of business process, and checking whether the fragment selected by the user corresponds to one of the fragments of the second representation. The computer-implemented method may also include instantiating a business process pattern using the selected fragment if the fragment selected corresponds. The selected fragment is re-usable within the business process pattern. Other embodiments of the computer-implemented method are also described.

Another computer-implemented method for assisting a user in applying a business process pattern is described. In some embodiments, the computer-implemented method includes providing a graphical user interface (GUI) adapted for displaying a first representation of a business process and for allowing user editing of the business process. The computer-implemented method also includes receiving a user selection of a fragment of the business process as displayed in the first representation. In some embodiments, the computer-implemented method includes calling a second representation of the business process, the second representation including a plurality of elements of the business process displayed in the first representation. The computer-implemented method may also include calling a second representation of the business process, the second representation being a hierarchy of fragments of business process. In some embodiments, the computer-implemented method includes checking whether the fragment selected by the user corresponds to one of the fragments of the second representation by searching the second representation for a hierarchical parent of those elements that correspond to the elements selected by the user or by searching for a sub-fragment of such a hierarchical parent. The computer-implemented method, in one embodiment, includes instantiating a business process pattern using the selected fragment if the fragment selected corresponds to such a hierarchical parent or a sub-fragment of such a hierarchical parent. The selected fragment may be re-usable within the business process pattern. Other embodiments of the computer-implemented method are also described.

Other aspects and advantages of embodiments of the present invention will become apparent from the following detailed description, taken in conjunction with the accompanying drawings, illustrated by way of example of the principles of embodiments of the invention.

DETAILED DESCRIPTION

Embodiments of a computerized method for assisting a user in applying business process patterns are described. Broadly, the user is provided with a graphical user interface or GUI suitable for editing and displaying a business process in a given representation (e.g. a graph showing elements coupled to each other). When the user selects a fragment of the business process as displayed in the said given representation, another (e.g. internal) representation of the business process is called. The latter may be a hierarchy of fragments, e.g. hierarchical levels of agglomerative clusters of elements of the process, corresponding to elements as displayed. As such, the second representation is suitable for enquiring about the validity of a selected fragment, i.e. for checking whether one of the fragments it includes actually corresponds to the fragment selected by the user, independently of the size and complexity of the selected fragment. If the fragment selected corresponds, a business process pattern can be instantiated based on the selected fragment. The fragment selected by the user is thereby reused within the business process pattern, when applying the latter, which in practice substantially benefits to the design of business processes.

Interestingly, the second representation is already available for comparison when the user selects a fragment. Computing this representation ensures a valid (internal) representation of the business process. It can however require substantial CPU's execution resources in some cases. Here, the internal representation need not be computed upon selection of a fragment, as the process was already checked a priori, making the system prompt to react to a given selection by the user. Furthermore, in embodiments, the selection of the fragment can be constrained such that the fragment is safely connectable to the current process, thereby ensuring that the process is representable in fine (and thus valid).

Figure 1:
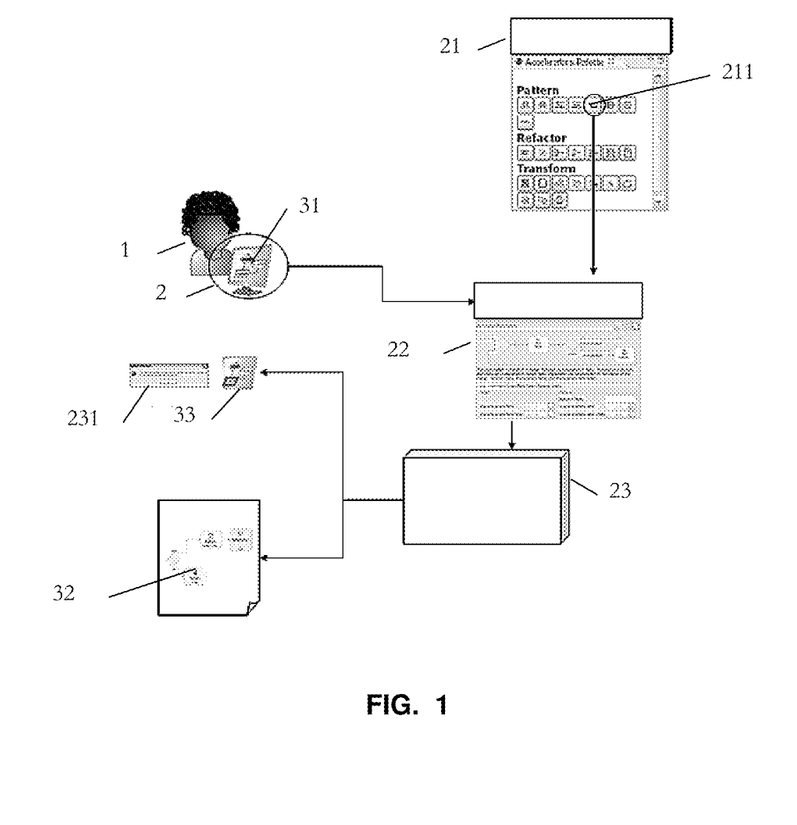
FIG. 1 depicts a user interacting with a graphical interface having several components.

In practice, as depicted in FIG. 1, a user 1 interacts with the GUI 2, the latter designed for editing and displaying a business process BP. A given representation is used at display, e.g. a graph showing typical elements of a business process 31 (task, decision, input, output, etc.), coupled to each others. As to be discussed later, a two-terminal graph or TTG is well suited for that use. Various widgets 21-23 in the GUI can advantageously be implemented for enabling fast and reliable interaction with the user. In particular, and as to be discussed in details later, a palette can be displayed, offering various business patterns available for selection (e.g. with a haptic device). A wizard 22 might be triggered after selection of a given business pattern 211, to guide the user through steps for instantiating this pattern. Finally, a pattern controller 23 might be involved to validate the instantiated pattern with respect to pattern constraints; update the business process 32 if the instantiated pattern is validated, or revert to user with feedbacks (e.g. warning 231, suggested variant 33, etc.). Although the type of GUI suggested in FIG. 1 is particularly advantageous in terms of ergonomics, other types of GUIs can yet be contemplated.

Figure 2:
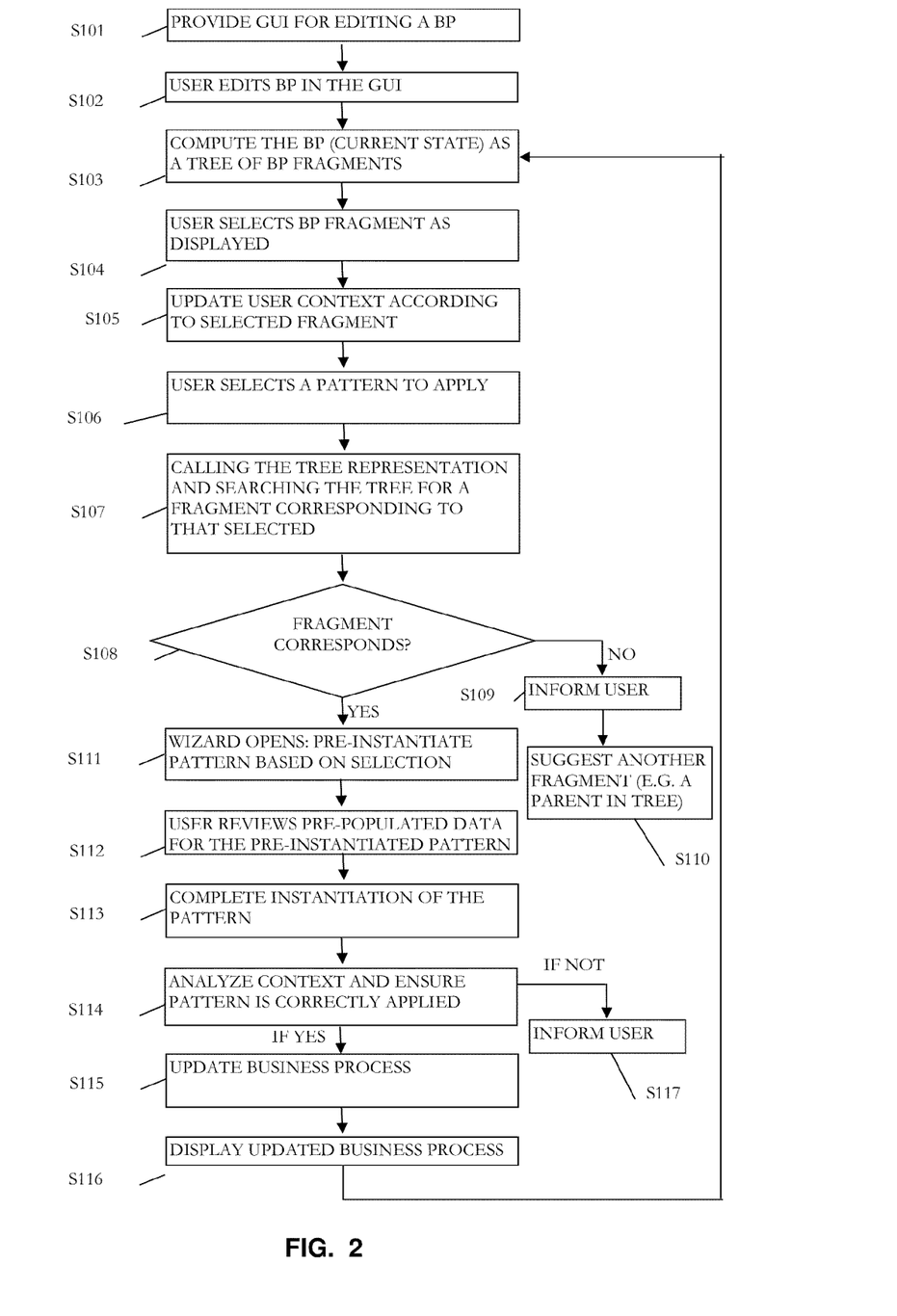
FIG. 2 is a flowchart of steps implemented in an embodiment of a method for assisting a user in applying a business process pattern.

FIG. 2 shows a flowchart illustrating, step-by-step, an embodiment of a method for assisting a user in applying a business process pattern. In reference to FIG. 2, the user is provided with a GUI such as in FIG. 1, Step S101. A business process BP is displayed therein, using a first representation, such as a graph-based representation.

Optionally, at step S102, the user edits the BP via the GUI.

After updating the BP with recent edits (if necessary), a second (internal) representation of the business process is computed, step S103. The second representation is basically a hierarchy of fragments, e.g. hierarchical levels of agglomerative clusters of elements of the process, as to be discussed later.

Step S104: next, the user selects a fragment of the business process elements as displayed.

The user context is then updated, notably based on the selected fragment, step S105. The user context might further be impacted by other data, like data pertaining to the last saved version of the process, or more recent edits.

Step S106: the user selects a given pattern to be applied. Several types of pattern are likely available, e.g. from a palette of patterns displayed in the GUI. Examples of patterns are described below. A pattern can be regarded as a complex type of BP elements (like a loop, parallel tasks, etc), which needs to be populated with data in order to become an instance of the process, i.e. it has to be instantiated.

Step S107: The second (internal) representation of the BP is called and it is checked (test S108) whether the fragment selected by the user corresponds to one of the fragments of the second representation. Relying on e.g. hierarchical levels of agglomerative clusters of BP elements makes it suitable for searching fragments of any size or shape. In one embodiment, the fragments in the second representation have each a single entry and a single exit, whereby a tree representation is easily achieved. The fragment selected by the user can be constrained to have a single entry and a single exit too, whereby a match is likely to be found with a fragment as in the second representation. More will be said in reference to FIGS. 11-12.

If no correspondence is found, the user is accordingly informed, step 109. As to be described later, a suggestion of a more suitable fragment can be done here, step S110.

If the fragment selected corresponds to a fragment as in the second representation, a wizard is launched for guiding the user through the instantiation of the BP pattern, step 111. In a variant, the wizard is launched upon selection of the pattern and informs the user if the fragment selection is not valid.

Advantageously, the pattern can be pre-instantiated based on the user context (and notably the fragment just selected), such that (at least some of) the data required for the instantiation are already pre-populated. In other words, the pattern is pre-configured according to a current context. Data pertaining to the current context are e.g. imported by the wizard, judiciously recast and submitted to the user for review. Basically, fields in the wizard are pre-populated according to the context. For example, for a fragment consisting of a sequence and a pattern consisting of a loop, the wizard may, by default, suggest to loop back from the last element in the sequence to the first element.

Besides, the user context considered can differ. It can for instance restrict to a current state of the BP (e.g. last saved version), and/or include more recent edits/actions from the user, especially if no fragment is selected prior to pattern selection. It can further encompass the last user selection (i.e. fragment). In any case, a recent intent of the user is captured, making the design more intuitive and efficient.

The user can review the pre-populated data, step 112, if necessary modify them, and complete the pattern instantiation, step 113.

As evoked earlier, a controller may be invoked at this point, step S114, to perform further checks as to the instantiated pattern (this is described in more detail later). If the controller detects that the pattern can or should not be applied correctly owing to inappropriate user inputs (e.g. it is technically impossible to apply the pattern or it does not make sense in the business context), it informs the user accordingly, S117.

Else, the first representation of the BP is updated according to the instantiated pattern, step S115, whereby the updated model can be displayed (e.g. immediately), step S116.

The method may loop back to step S103, where a new internal representation is computed for the updated BP. In a variant embodiment, no new second representation is recomputed by default, assuming that the user does not want to re-use a fragment which is not already represented in the second representation, thereby saving computational resources.

Figure 3:
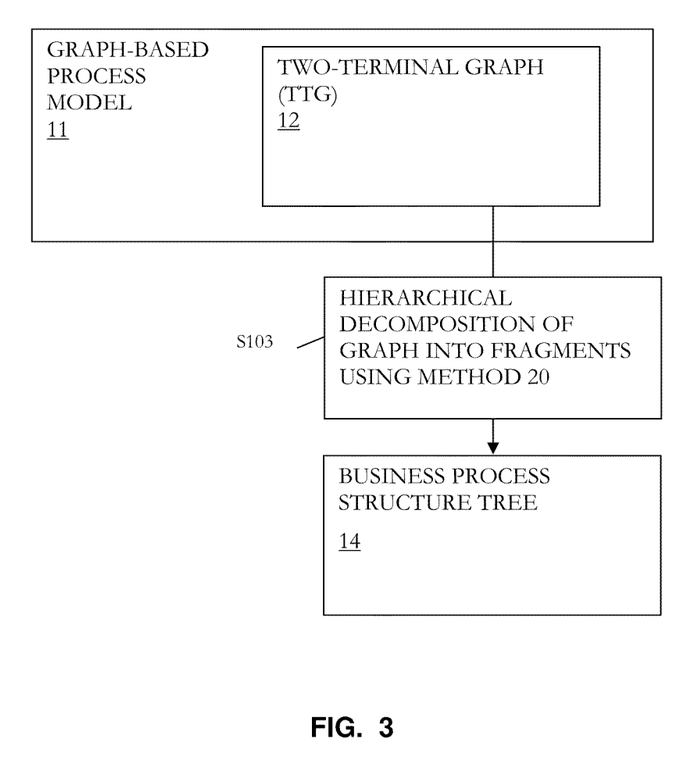
FIG. 3 is a flowchart depicting one embodiment of a decomposition of a first representation of a business process into a second representation of the business process.

How the second representation is computed is now discussed in more detail in reference to FIG. 3.

Initially, the system includes a graph-based process model 11 (the model underlying the first representation), a suitable decomposition method 20 for decomposing the graph-based model.

As said, the graph-based process model 11 may be represented as a two-terminal graph 12. It describes a control flow of business processes with workflow graphs. Workflow graphs may be expressed in e.g. business process languages. Examples of business process languages may be, inter alia, the Business Process Modeling Notation (BPMN) by the Object Management Group (OMG®), the Unified Modeling Language Activity Diagrams (UML AD), the Event-driven Process Chain diagrams (EPC), etc. The two-terminal graph 12 is a workflow graph that has two terminals, a source and a sink. Because of the source and the sink, the two-terminal graph 12 can also be referred to as a single-entry-single-exit workflow graph, where the source represents an entry and the sink represents an exit. The two-terminal graph 12 is defined as a directed graph without self-loops such that there is a unique source node s, the entry, and a unique sink node t, the exit, that is not identical to s (t≠s) and each node of the two-terminal graph 12 is on a directed path from s to t.

At step S103, also depicted in FIG. 3, the two-terminal graph 12 is parsed into a hierarchy of blocks that represent sub-workflows that have an entry and an exit by the hierarchical decomposition method 20. The block-based process model that results is represented as a process structure tree (or PST) 14, i.e., the second representation evoked above. The resulting block-based process model may e.g. describe a business flow in terms of blocks of the business flow. An example of block-based process model may be, inter alia, the Business Process Execution Language (BPEL) by OASIS®. A business process modeled in the resulting block-based process model can be executed on a computer platform.

The hierarchical decomposition method 20 preferably parses the two-terminal graph 12 into the process structure tree 14 that has unique, modular, and fine blocks. The above hierarchical decomposition method 20 is also preferably deterministic, i.e., it generates unique canonical fragments. Thus, identical two-terminal graphs are parsed into the same process structure tree after being decomposed. The above decomposition method 20 is applied ex-ante, that is, to the process as it stands before re-using a fragment within a pattern, at no cost for the system.

Embodiments of a particularly elaborated implementation shall now be described in reference to FIGS. 4-15.

In this implementation, main focuses are the maintenance of a user context, the availability of a user-configurable and context-sensitive palette, a pattern wizard for guiding the user in correctly instantiating a selected pattern, and a pattern controller ensuring that the process model is correctly updated using the pattern instance or, if not possible, providing context-sensitive feedback to the user. Details of these components are described next.

First, concerning the user context: as evoked earlier, the user context may encompass the last saved state of the process model, recent user edits, and selected elements of the process (i.e. a fragment).

The set of BP elements that can be selected is a priori not restricted. In particular, disconnected elements can be selected or, even, no element can be selected. The set of BP elements is analyzed by the pattern controller. As a result, the set of available patterns that is displayed on the palette or the context menu can change. Furthermore, information is extracted from this context to pre-populate and adjust the pattern wizard.

FIGS. 4-7 illustrate possible selections of BP elements, in an example of BP. The BP at stake comprises, from left to right, an input, a task ("Task"), a decision, alternative tasks ("Task Name 1", "Task Name 2"), a subsequent decision and a final task ("Task:2"), preceding output. The connections between elements (arrows) are explicitly shown. Corresponding analytical tests can be implemented for the three types of selections. Other type of selections and tests can yet be contemplated.

Figure 4:
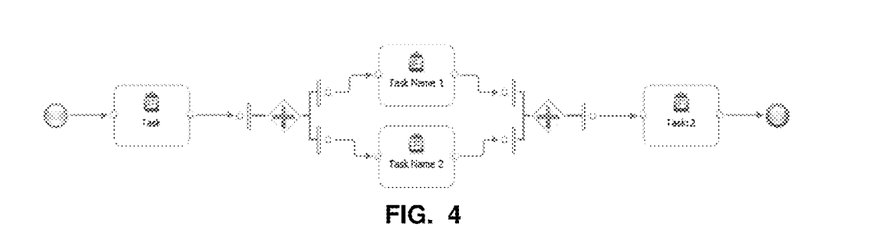
FIGS. 4-7 exemplify alternative embodiments of a method of selecting elements of a business process.

In FIG. 4, no element is selected. Any pattern is then applicable, depending on the available patterns in the pattern library it can also be only a subset of the available patterns. The pattern will be placed on an empty area of a canvas in the GUI.

Figure 5:
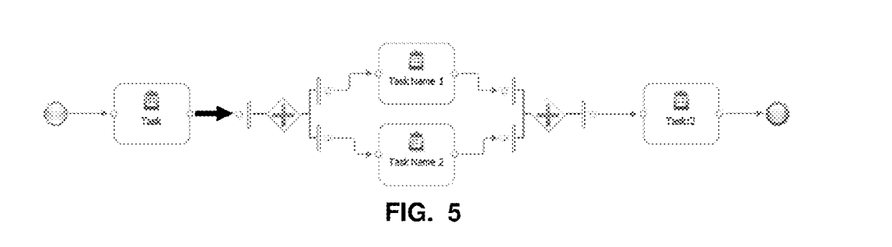

In FIG. 5, a single connection (bold arrow) is selected. Some, but not all patterns are here applicable. A pattern shall be placed between the source and target elements of the connection to refine the connection.

Figure 6:
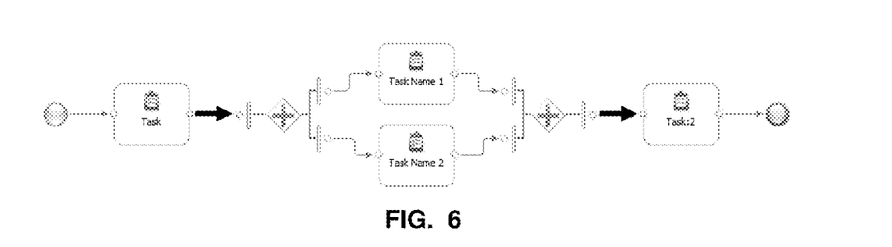

In FIG. 6, two connections are selected. Some patterns are applicable. The fragment between the two connections is for example reused to instantiate the pattern. It is checked that the fragment fulfills some requirements, e.g., the fragment forms a connected graph of elements that has a single entry and a single exit connection. Other tests that check different syntactic or semantic properties of the process fragment can be contemplated.

Figure 7:
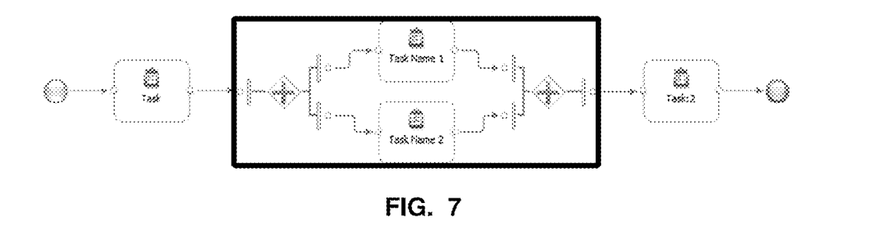

In FIG. 7, BP elements are selected, e.g. with a tool for selecting objects or simply by squaring elements with a mouse pointer. Some patterns are applicable in this case. The analysis checks that we have a connected fragment as in the previous case.

Next, patterns can be selected from a context menu or from a palette (as depicted in FIG. 1, ref. 21). In the menu, each pattern is shown with e.g. its name and an icon. In the palette, an icon or any representation of the pattern is shown. When the user hovers with the mouse over the icon, the pattern name is displayed, possibly together with explanation. The menu can be reached by clicking on an editor canvas or by selecting it from a tool bar. The palette is a user-configurable view that can be placed by the user anywhere in the GUI. Population of the palette and the menu can depend on the user context.

The palette is configurable by the user, which allows creating and naming user-specific groups of patterns and selecting the patterns that appear within each group. A separate user interface may be available to ease configuration of the groups.

Figure 10:
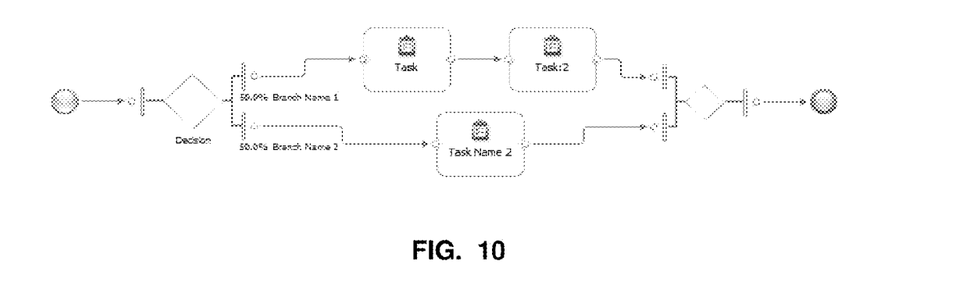

Concerning the reusability of fragments, in embodiments, patterns are allowed to be applied to a business process even if the pattern is not just applied to a single edge. This gives the user the ability to reuse parts of the process that he has already created. For instance, sometimes it is desirable to reuse the two tasks "Task" and "Task:2" as in the simple sequential process depicted in FIG. 8. The user shall thus select the two tasks in the GUI, for example following the selection mode of FIG. 7. The user may for instance want, during a design session, to use each of the two tasks as an upper branch of a pattern that is selected by the user too, see FIG. 9. The result of a given application scenario is shown in FIG. 10.

In order to reuse an existing process fragment, it shall be checked whether a correct fragment has been selected. This can be achieved via the process structure tree described above or more generally, using any suitable representation of a hierarchy of fragments. The second representation may be computed such that agglomerative clusters at a same hierarchical level comprise distinct elements of the process, which ensures that fragments therein are mostly valid. In addition, a process structure tree as described in reference to FIG. 3 is advantageous inasmuch as it decomposes the process graph into fragments that each has a single entry and a single exit. Also, it provides a hierarchy, whereby any size of fragments can a priori be identified.

As said, the fragment selected is further constrained to have a single entry and a single exit, for reuse within a process pattern. Different approaches might be contemplated, which allow the user to select such a fragment.

A first approach is the direct selection of the entry and exit edges, which turns out to be easier in practice. Here, the user selects first the entry edge and then the exit edge (e.g. the first and last connections in FIG. 8). Then, assuming that the user selects the entry/exit edges of the fragment (s)he wants to reuse, an algorithm may be the following.

1. Compute in advance the process structure tree of the process in which the user wants to insert the pattern (step S103 of FIG. 2).
2. Search the process structure tree for fragments that contain the edges selected by the user as entry or exit edges, or for a sequential fragment that comprises a connected sub-fragment, see below.
3. If the two edges are entries and exits of a same fragment (or sub-fragment) as identified in the PST, the fragment is identified.
4. Else, the edges are entries and exits of two different fragments, which may belong to a same sequence. Thus, parent fragment are explored until a fragment is identified, if any.

Figure 8:
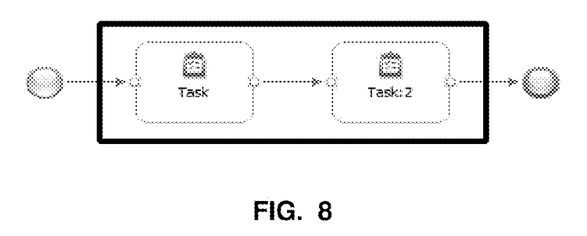
FIGS. 8-10 exemplify one embodiment of a concurrent selection of a fragment and a pattern.
Figure 9:
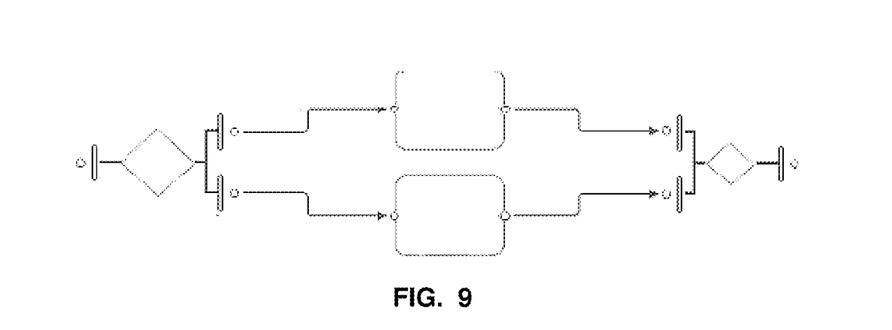

In a variant embodiment (e.g. offered to the user too), the user selects all of the elements that (s)he intend to reuse, as in FIG. 7 or 8. In this case:

1. Again, the process structure tree is first computed.
2. Traversal of the tree allows for finding at least one fragment enclosing all elements selected by the user (at least the root). The smallest fragment that comprises all the elements selected is considered (or a sub-fragment).
3. If the fragment located includes all of the selected elements and only these elements, a valid fragment has been found.
4. Otherwise, the user is prompted to use instead a fragment corresponding to a superset of the selected elements (i.e. a hierarchical parent which includes more elements than those corresponding to the elements in the fragment selected by the user).

Independently of the selection mode, the user selection if checked is checked by searching the process tree for a parent or a sub-fragment thereof that exactly corresponds to the elements selected. If no such fragment can be found, then the smallest parent node that contains at least the same elements as selected by the user is suggested for use in the instantiation.

Figure 11:
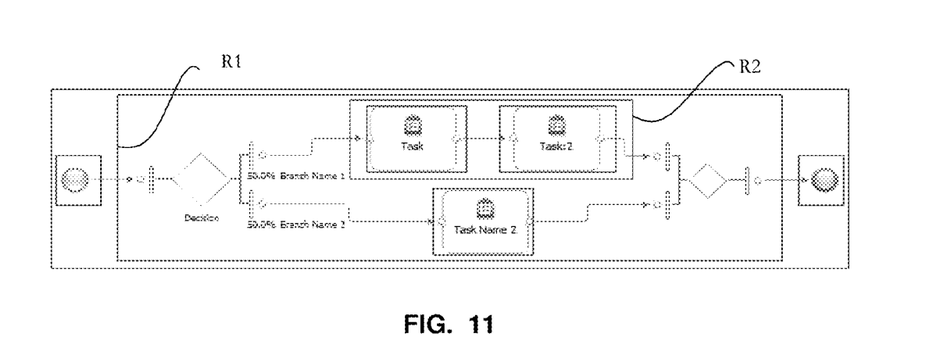
FIGS. 11 and 12 illustrate embodiments of two alternative representations of a business process (such as the first and second representations evoked in FIG. 3).
Figure 12:
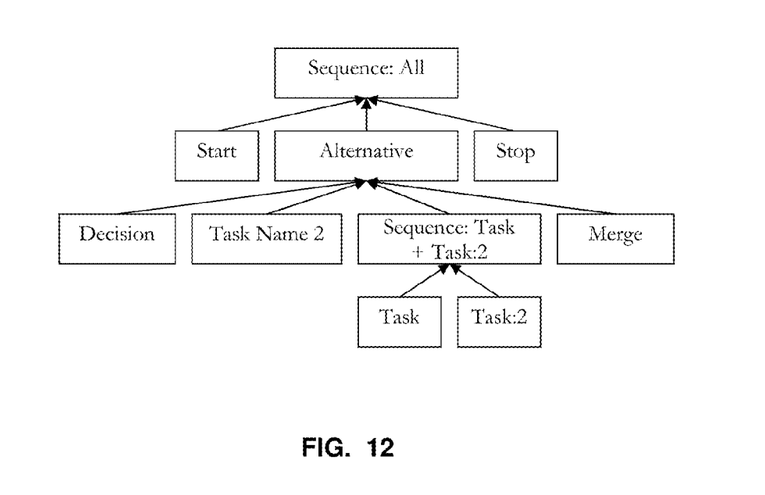

In this regards, FIGS. 11 and 12 illustrate two versions of the same process as in FIG. 10, one in the first representation (e.g. the graph based version), FIG. 11, the other in the second representation (the hierarchical tree, FIG. 12). Here, the graph of FIG. 10 has been decomposed into hierarchical levels of agglomerative clusters of BP elements of the process. The clusters are materialized in FIG. 11, on top of the graph, for the sake of understanding, although they need not be visualized in practice. A tree-like counterpart is shown in FIG. 12. The correspondence can be easily grasped in this case. For example, the nodes "Task" and "Task:2" are each atomic fragments containing a single BP element, that is, a single task. They have a common parent, i.e. the sequence Task+Task:2. Thus, if the user selects the fragment R2, as of the graph representation of FIG. 10 or 11, exploring the tree of FIG. 12 returns the sequence Task+Task:2 as the parent containing the sole elements selected. Similarly, selecting R1 returns the fragment named "Alternative", i.e. the whole sequence but the input and output ("Start" and "Stop").

Yet, in variants, refinements may be implemented which allow to identify a connected sub-fragment inside a sequential fragment. This turns advantageous when it cannot be found a hierarchical parent of only those elements that correspond to the user selection. Yet, it can always be found a parent which at least contains the same elements as selected by the user. Thus, if such a parent is a sequential fragment, it can easily be searched for a connected sub-fragment corresponding to the fragment selected by the user. If such a sub-fragment is found, it can be used in the pattern instantiation, such as to satisfy user expectations.

Figure 13:
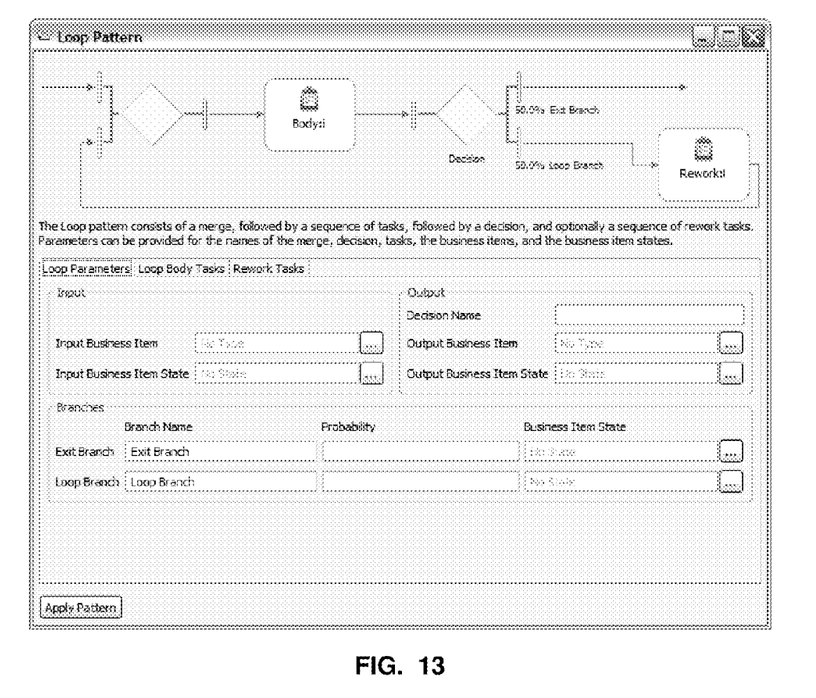
FIG. 13 is a screenshot of one embodiment of a wizard.

A word is said as to the pattern wizard in one embodiment, i.e. the user interface component that eases the pattern instantiation. A sample embodiment of a wizard is shown in the screenshot of FIG. 13. The wizard opens on the screen when a pattern is invoked from the palette or menu. Not all patterns might come with a wizard. As seen, the wizard is composed out of three main parts: a graphical visualization of a pattern (on top), underneath is a textual description. The lower part comprises widgets where the user edits/enters information to instantiate the pattern.

Interestingly, each part can adjust to the user context. For example, depending on the selection by the user (e.g., a single connection vs. a process fragment), the wizard shows different description and visualization, and values in the widgets may be pre-instantiated differently. Furthermore, the context also determines what information can be entered by the user to instantiate the pattern. Some fields in the widgets might be activated or deactivated for this purpose.

The wizard is designed such as to allow the user to navigate through the individual elements, which can also be coupled with each other. For example, when clicking on an element in the visualization, a corresponding tab in the widget can become active. Additionally, a separate textual explanation might be shown for this element. The navigation and entry of elements can be supported visually by highlighting the part in the picture that corresponds to the currently selected tab and marking tabs or elements that still needs inspection/edit by the user. An "Apply Pattern", bottom left, is pressed for completing the instantiation.

Furthermore, the pattern wizard manages constraints between the different parameters. The constraints are defined when the pattern is authored and added to the pattern library. A user of a pattern does not need to be aware of these constraints. The pattern wizard ensures that constraints are satisfied by e.g. pre-instantiating a non-modifiable parameter value, rejecting user input, or automatically re-adjusting input values.

In an embodiment, fields that must have a same value can be highlighted in the wizard, e.g. surrounded with a box of a same color. The dependencies, i.e., the enforced constraint set, can also change dynamically based on the context and user input into the wizard.

Next, when the user clicks the Apply Pattern button, the pattern controller creates the pattern instance and checks if this instance can be successfully applied to the current context. Different criteria of success can be defined by a pattern author. For example, an API is available for the pattern author that makes it easy to describe any analysis tests for the user context, the set of constraints for the wizard, and the success criteria for the pattern instance application.

Figure 14:
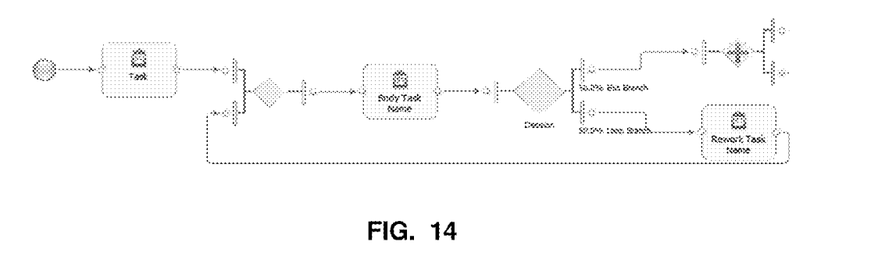
FIGS. 14-15 exemplify one embodiment of a role exerted by a controller, after instantiation of a pattern by a wizard such as in FIG. 13.
Figure 15:
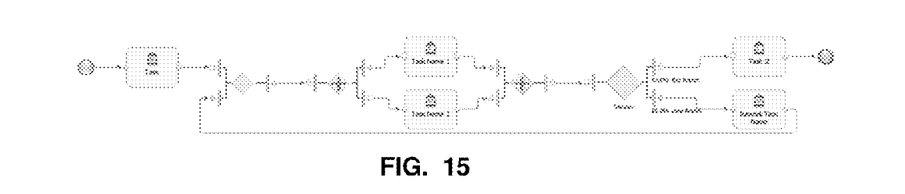

In FIGS. 14 and 15, we see one embodiment of a loop pattern instance at the top as it is created when the user provides no values in the pattern wizard. At the bottom, we see another instance of the same pattern that results when the fragment of FIG. 7 is selected for instantiating the pattern.

If the pattern instance can be successfully applied, the controller updates the business process model in the editor with the pattern instance. Otherwise, it gives context-sensitive feedback to the user explaining why the pattern could not be applied. The feedback can contain references to the user context and the values provided by the user in the widget. It can optionally also lead to markings of model elements in the editor.

Some embodiments of the present invention may suitably add several extensions to a business process modeler such as the WebSphere Modeler (in the latter case, when users install the pattern-based accelerators in the tool). As embodied in WebSphere, embodiments provide:
  An algorithm that identifies under which circumstances a user can reuse an existing process fragment as part of a pattern;
  An algorithm that ensures that the resulting pattern and its application is correct;
  a palette (and context menu) showing all patterns;
  a wizard to instantiate patterns;
  a pattern controller that ensures that patterns are correctly applied to a model analyzing the current context.

The user advantageously interacts in the following way with these extensions. By selecting some elements of the process model, the context for any subsequent pattern application is set. This context contains the current state of the process model in the editor (the last saved state), any changes/editing operations applied to the process after the last save operation, and a set of selected BP elements. No restrictions on the selections are a priori imposed. Instead, the pattern application controller analyzes the selection and ensures that a pattern is always applied correctly.

The business process patterns that are provided encapsulate typical process model fragments that occur and re-occur in business process models. The encapsulated fragments represent common and easy-to-reuse control-flow structures that can also be associated with business items and business item states. In composing a process from these patterns, it is ensured that the process correctly executes in a process simulation environment such as the one provided by WebSphere Business Modeler and that it can be mapped to a combination of workflow patterns for a correct implementation in a process runtime engine.

Instruction operations involved in embodiments of the present invention may be implemented in programs that are executable on computer systems. Each computer program may be implemented in a high-level (e.g. procedural or object-oriented) programming language, or in assembly or machine language if desired; and in any case, the language may be a compiled or interpreted language. Suitable processors include, by way of example, both general and special purpose microprocessors. Instruction operations may be stored on a computer program product tangibly embodied in a machine-readable storage device for execution by a programmable processor; and method steps of embodiments of the invention may be performed by a programmable processor executing instructions to perform functions of embodiments of the invention. Embodiments of the invention encompass the resulting computer system.

More generally, the above embodiments may be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks or the like.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, various types of trees can be contemplated, showing e.g. hierarchical levels of agglomerative clusters of elements of the process.

What is claimed is:

1. A computer-implemented method for assisting a user in applying a business process pattern, the computer-implemented method comprising:
  providing a graphical user interface (GUI) adapted for displaying a first representation of a business process and for allowing user editing of the business process and user selection of any fragment of the business process;
  receiving a user selection of a fragment of the business process as displayed in the first representation;
  calling a second representation of the business process, the second representation comprising a hierarchy of fragments of the business process, wherein the second representation comprises fragments each having a single entry and a single exit;
  searching the second representation and checking whether the fragment selected by the user corresponds to a single entry and single exit of one of the fragments of the second representation; and if the fragment selected corresponds to the single entry and single exit of one of the fragments of the second representation, instantiating a business process pattern using the selected fragment, whereby the selected fragment is re-usable within the business process pattern.

2. The computer-implemented method of claim 1, wherein instantiating the business process pattern comprises pre-instantiating the business process pattern by pre-configuring it according to a current user context.

3. The computer-implemented method of claim 2, further comprising receiving a user selection of the business process pattern, after the user selection of the fragment, the business process pattern being furthermore pre-instantiated according to the current user context, wherein the current user context comprises the selected fragment.

4. The computer-implemented method of claim 3, wherein the current user context depends on a current state of the business process and the selected fragment.

5. The computer-implemented method of claim 3, further comprising launching a wizard for helping the user in completing the step of instantiating the business process pattern, the wizard pre-populated with data according to the current user context.

6. The computer-implemented method of claim 5, further comprising receiving at least one of user editing or creation of data via the wizard.

7. The computer-implemented method of claim 6, further comprising invoking a pattern controller to check whether data edited or created by the user via the wizard makes the pattern applicable to the current user context.

8. The computer-implemented method of claim 3, wherein receiving the user selection of the business process pattern comprises receiving a user selection thereof in a palette of business process patterns displayed in the graphical user interface.

9. The computer-implemented method of claim 8, wherein the palette is user-configurable.

10. The computer-implemented method of claim 8, wherein the palette auto-adjusts according to a current user context.

11. The computer-implemented method of claim 2, further comprising, after instantiating, a step of updating the business process.

12. The computer-implemented method of claim 11, further comprising displaying the updated business process in the GUI.

13. The computer-implemented method of claim 1, wherein receiving the user selection of a fragment of the business process comprises receiving user selection of an input edge and an output edge of the fragment of the business process as displayed in the first representation thereof.

14. The computer-implemented method of claim 13, wherein checking the fragment selected by the user further comprises searching the second representation for a fragment associated to the same input edge and the same output edge as selected by the user.

15. The computer-implemented method of claim 1, wherein receiving user selection of a fragment comprises receiving user selection of a plurality of elements of the business process as displayed in the first representation, and wherein checking the fragment selected by the user comprises searching the second representation for a hierarchical parent of elements that correspond to the elements selected by the user.

16. The computer-implemented method of claim 15, further comprising searching for a hierarchical parent which includes only those elements that correspond to the elements selected by the user.

17. The computer-implemented method of claim 16, further comprising prompting the user to instantiate the business process pattern based on a hierarchical parent which includes more elements than those elements that correspond to the elements selected by the user, if no hierarchical parent which includes only those elements that correspond to the elements selected by the user is found.

18. The computer-implemented method of claim 16, further comprising, if no hierarchical parent of only those elements that correspond to the selected elements is found, searching for a hierarchical parent which is a sequential fragment and comprises a connected sub-fragment, wherein the connected sub-fragment corresponds to the fragment selected by the user.

19. The computer-implemented method of claim 1, further comprising computing the second representation as a tree reflecting hierarchical levels of agglomerative clusters of elements of the process as displayed in the first representation.

20. The computer-implemented method of claim 19, wherein the tree is further computed such as to decompose the business process into fragments having each a single entry and a single exit.

21. The computer-implemented method of claim 19, wherein the second representation is computed such that agglomerative clusters at a same hierarchical level comprise distinct elements of the process.

22. A computer program residing on a computer-readable medium, comprising instructions for causing a computer system to implement the computer-implemented method of claim 1.

23. A computer system, comprising one or more processors and a memory, operatively interconnected to one another and configured to implement the computer-implemented method of claim 1.

24. A computer-implemented method for assisting a user in applying a business process pattern, the computer-implemented method comprising:
   providing a graphical user interface (GUI) adapted for displaying a first representation of a business process and for allowing user editing of the business process and user selection of any fragment of the business process;
   receiving a user selection of a fragment of the business process as displayed in the first representation, wherein the selected fragment comprises a plurality of elements of the business process as displayed in the first representation;
   calling a second representation of the business process, the second representation being a hierarchy of fragments of business process, wherein the second representation comprises fragments each having a single entry and a single exit;
   searching the second representation and checking whether the fragment selected by the user corresponds to a single entry and single exit of one of the fragments of the second representation by searching the second representation for a hierarchical parent of those elements that correspond to the elements selected by the user or by searching for a sub-fragment of such a hierarchical parent; and
   if the fragment selected corresponds to such a hierarchical parent or a sub-fragment of such a hierarchical parent and to the single entry and single exit of one of the fragments of the second representation, instantiating a business process pattern using the selected fragment, whereby the selected fragment is re-usable within the business process pattern.

* * * * *